United States Patent [19]

Shallenberger et al.

[11] Patent Number: 4,900,507

[45] Date of Patent: Feb. 13, 1990

[54] NUCLEAR FUEL ASSEMBLY DEBRIS FILTER BOTTOM NOZZLE

[75] Inventors: John M. Shallenberger; Stephen J. Ferlan, both of Pittsburgh, Pa.

[73] Assignee: Westinghouse Electric Corp., Pittsburgh, Pa.

[21] Appl. No.: 211,150

[22] Filed: Jun. 22, 1988

Related U.S. Application Data

[63] Continuation of Ser. No. 46,219, May 5, 1987, abandoned.

[51] Int. Cl.⁴ .................. G21C 19/30; G21C 15/06
[52] U.S. Cl. ................................. 376/352; 376/313; 376/434; 376/443
[58] Field of Search ............... 376/352, 353, 362, 364, 376/365, 313, 438, 439, 434, 443

[56] References Cited

U.S. PATENT DOCUMENTS

| | | | |
|---|---|---|---|
| 2,938,848 | 5/1960 | Ladd et al. | 376/352 |
| 3,725,199 | 4/1973 | Notari et al. | 376/352 |
| 3,801,453 | 4/1974 | Jones | 176/78 |
| 3,878,870 | 4/1975 | Atherton et al. | 376/352 |
| 3,879,250 | 4/1975 | Persson et al. | 376/362 |
| 3,941,654 | 3/1976 | Tarasuk et al. | 376/352 |
| 4,036,690 | 7/1977 | Betts et al. | 376/362 |
| 4,076,586 | 2/1978 | Bideau et al. | 176/78 |
| 4,096,032 | 6/1978 | Mayers et al. | 176/38 |
| 4,309,251 | 1/1982 | Anthony et al. | 376/364 |
| 4,323,428 | 4/1982 | Schallenberger et al. | 376/353 |
| 4,427,624 | 1/1984 | Marlatt et al. | 376/352 |
| 4,560,532 | 12/1985 | Barry et al. | 376/445 |
| 4,615,862 | 10/1986 | Huckestein | 376/362 |
| 4,678,627 | 7/1987 | Rylatt | 376/313 |
| 4,684,495 | 8/1987 | Wilson et al. | 376/364 |
| 4,781,884 | 11/1988 | Anthony | 376/313 |

FOREIGN PATENT DOCUMENTS

| | | | |
|---|---|---|---|
| 0102493 | 8/1979 | Japan | 376/313 |
| 4141989 | 11/1979 | Japan | 376/352 |
| 0784890 | 12/1980 | U.S.S.R. | 210/521 |
| 0028977 | of 1906 | United Kingdom | 210/521 |

*Primary Examiner*—Harvey E. Dehrend

[57] ABSTRACT

A debris filter bottom nozzle in a fuel assembly has support structure in the form of four legs adapted to rest on a lower core plate of the nuclear reactor and a nozzle plate fixed one side of the four legs facing toward a lowermost grid of the fuel assembly. The nozzle plate has defined therethrough only a plurality of flow holes individually smaller in size than the maximum dimension of unoccupied spaces through the lowermost grid which allow flow of liquid coolant through the nozzle plate. Therefore, any debris being carried by the liquid coolant flowing through the bottom nozzle from the lower core plate to the fuel assembly which is small enough in size to pass through the flow holes will also pass through the unoccupied grid spaces, whereas any debris which is large enough to not pass through the unoccupied grid spaces and collect in the grid will not pass through the aperture plate flow holes.

6 Claims, 4 Drawing Sheets

NUCLEAR FUEL ASSEMBLY DEBRIS FILTER BOTTOM NOZZLE

CROSS REFERENCE TO RELATED APPLICATIONS

Reference is hereby made to the following copending patent applications dealing with related subject matter and assigned to the assignee of the present invention:

1. "Debris Trap For A Pressurized Water Nuclear Reactor" by John F. Wilson et al, assigned U.S. Ser. No. 672,040 and filed Nov. 16, 1984. (W.E. No. 52,222) now U.S. Pat. No. 4,684,496, issued Aug. 4, 1987.

2. "Fuel Assembly Bottom Nozzle With Integral Debris Trap" by John F. Wilson et al, assigned U.S. Ser. No. 672,041 and filed Nov. 16, 1984. (W.E. No. 52,223) now U.S. Pat. No. 4,684,495, issued Aug. 4, 1987.

3. "Wire Mesh Debris Trap For A Fuel Assembly" by William Bryan, assigned U.S. Ser. No. 679,511 and filed Dec. 7, 1984. (W.E. No. 52,287) now U.S. Pat. No. 4,664,880, issued May 12, 1987.

4. "Debris-Retaining Trap For A Fuel Assembly" by John A. Rylatt, assigned U.S. Ser. No. 720,109 and filed Apr. 4, 1985. (W.E. No. 52,484) now U.S. Pat. No. 4,678,627, issued July 7, 1987.

5. "Bottom Grid Mounted Debris Trap For A Fuel Assembly" by Harry M. Ferrari et al, assigned U.S. Ser. No. 763,737 and filed Aug. 8, 1985. (W.E. No. 2,803) now U.S. Pat. No. 4,652,425, issued Mar. 24, 1987.

This application is a continuation of application Ser. No. 046,219, filed May 5, 1987, now abandoned.

BACKGROUND OF THE INVENTION

FIELD OF THE INVENTION

The present invention relates generally to nuclear reactors and, more particularly, is concerned with a debris filter bottom nozzle in a nuclear fuel assembly.

DESCRIPTION OF THE PRIOR ART

During manufacture and subsequent installation and repair of components comprising a nuclear reactor coolant circulation system, diligent effort is made to help assure removal of all debris from the reactor vessel and its associated systems which circulate coolant therethrough under various operating conditions. Although elaborate procedures are carried out to help assure debris removal, experience shows that in spite of the safeguards used to effect such removal, some chips and metal particles still remain hidden in the systems. Most of the debris consists of metal turnings which were probably left in the primary system after steam generator repair or replacement.

In particular, fuel assembly damage due to debris trapped at the lowermost grid has been noted in several reactors in recent years. Debris enters through the fuel assembly bottom nozzle flow holes from the coolant flow openings in the lower core support plate when the plant is started up. The debris tends to become lodged in the lowermost support grid of the fuel assembly within the spaces between the "egg-crate" shaped cell walls of the grid and the lower end portions of the fuel rod tubes. The damage consists of fuel rod tube perforations caused by fretting of debris in contact with the exterior of the tube. Debris also becomes entangled in the nozzle plate holes and the flowing coolant causes the debris to gyrate which tends to cut through the cladding of the fuel rods Several different approaches have been proposed and tried for carrying out removal of debris from nuclear reactors Many of these approaches are discussed in U.S. Pat. No. 4,096,032 to Mayers et al. Others are illustrated and described in the U. S. patent applications cross-referenced above. While all of the approaches described in the cited patent and patent applications operate reasonably well and generally achieve their objectives under the range of operating conditions for which they were designed, a need still exists for a fresh approach to the problem of debris filtering in nuclear reactors. The new approach must be compatiable with the existing structure and operation of the components of the reactor, be effective throughout the operating cycle of the reactor, and at least provide overall benefits which outweigh the costs it adds to the reactor.

SUMMARY OF THE INVENTION

The present invention provides a debris filter bottom nozzle in a fuel assembly designed to satisfy the aforementioned needs. The bottom nozzle of the present invention includes a nozzle plate employing the concept of having flow holes smaller in diameter than used heretofore and of an increased number as well as smaller than the unoccupied spaces through the lowermost grid. The flow holes are preferably about 0.190 inch in diameter which makes them sized to filter out debris of damage-inducing size which otherwise collects primarily in the sections between the bottom nozzle and the lowermost grid and in the unoccupied spaces of the lowermost grid and causes fuel rod fretting failures. Unexpectedly, this concept reduces pressure drop of the debris filter bottom nozzle as compared to the prior art bottom nozzle although the total flow area through the bottom nozzle of the present invention is less than the total flow area through the prior art bottom nozzle. Significantly greater flow area is provided by the debris filter bottom nozzle pattern of smaller flow holes than by the prior art bottom nozzle pattern of larger flow holes in the local areas of the respective nozzle plates directly above the coolant inlet flow holes in the reactor lower core plate.

Accordingly, the present invention is directed to a debris filter bottom nozzle useful in a fuel assembly for a nuclear reactor wherein the fuel assembly includes a plurality of nuclear fuel rods, at least a lowermost grid supporting the fuel rods in an organized array and having unoccupied spaces defined therein allowing flow of liquid coolant therethrough. The debris filter bottom nozzle is disposed adjacent to and below the grid and below lower ends of the fuel rods. The bottom nozzle comprises: (a) support means adapted to rest on a lower core plate of the nuclear reactor; and (b) a nozzle plate fixed on the support means facing toward the lowermost grid and having defined therethrough only a plurality of flow apertures individually smaller in size than the maximum dimension of the unoccupied spaces through the lowermost grid which allow flow of liquid coolant through the nozzle plate such that any debris being carried by the liquid coolant which is small enough to pass through the flow apertures will also pass through the unoccupied grid spaces, whereas any debris being carried by the liquid coolant which is large enough to not pass through the unoccupied grid spaces and collect in the grid will not pass through the flow apertures.

More particularly, the flow aperatures are in the form of circular holes and uniform in cross-sectional size. Preferably, the flow holes are about 0.190 inch or less in diameter and are packed in a density of about 16 per square inch. Preferably, the holes are 0.190 +/−0.008 inch in diameter. The ligaments or sections of the nozzle plate extending between the flow holes have a maximum dimension of one-tenth inch. Further, the flow holes each have a long taper inlet chamfer of about 0.140 inch in length and forming an angle of about 12 to 15 degrees to a central axis of said hole. Still further, preferably the majority of flow holes are defined through the nozzle plate at locations directly above the inlet flow openings of the lower core plate.

These and other advantages and attainments of the present invention will become apparent to those skilled in the art upon a reading of the following detailed description when taken in conjunction with the drawings.

BRIEF DESCRIPTION OF THE DRAWINGS

In the course of the preceding discussion and following detailed description, reference has been and will be made to the attached drawings in which.

DETAILED DESCRIPTION OF THE INVENTION

Figure 1:
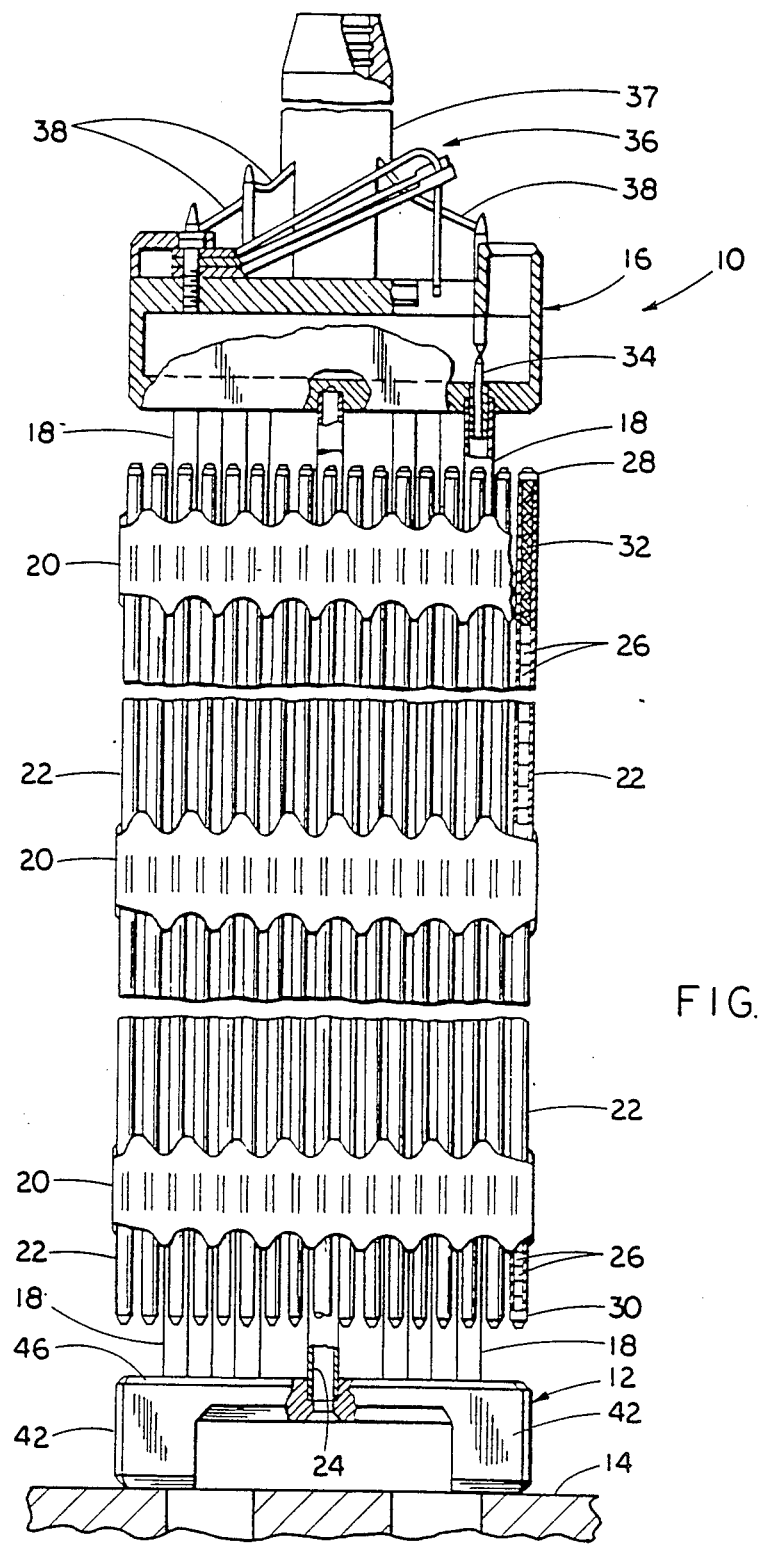
FIG. 1 is an elevational view, partly in section, of a fuel assembly which incorporates the debris filter bottom nozzle of the present invention, the assembly being illustrated in vertically foreshortened form with parts broken away for clarity.

In the following description, like reference characters designate like or corresponding parts throughout the several views of the drawings. Also in the following description, it is to be understood that such terms as "forward", "rearward", "left", "right", "upwardly", "downwardly", and the like are words of convenience and are not to be construed as limiting terms.

In General

Referring now to the drawings, and particularly to FIG. 1, there is shown an elevational view of a fuel assembly, represented in vertically foreshortened form and being generally designated by the numeral 10. The fuel assembly 10 is the type used in a pressurized water reactor and has a structural skeleton which at its lower end includes the debris filter bottom nozzle 12 of the present invention (which will be described later in detail). The bottom nozzle 12 supports the fuel assembly 10 on a lower core support plate 14 in the core region of a reactor (not shown). In addition to the bottom nozzle 12, the structural skeleton of the fuel assembly 10 also includes a top nozzle 16 at its upper end and a number of guide tubes or thimbles 18 which extend longitudinally between the bottom and top nozzles 12,16 and at opposite ends are rigidly attached thereto.

The fuel assembly 10 further includes a plurality of transverse grids 20 axially spaced along and mounted to the guide thimbles 18 and an organized array of elongated fuel rods 22 transversely spaced and supported by the grids 20. Also, the assembly 10 has an instrumentation tube 24 located in the center thereof and extending between and mounted to the bottom and top nozzles 12,16. With such an arrangement of parts, the fuel assembly 10 forms an integral unit capable of being conveniently handled without damaging the assembly parts.

As mentioned above, the fuel rods 22 in the array thereof in the assembly 10 are held in spaced relationship with one another by the grids 20 spaced along the fuel assembly length. Each fuel rod 22 includes nuclear fuel pellets 26 and is closed at its opposite ends by upper and lower end plugs 28,30. The pellets 26 are maintained in a stack thereof by a plenum spring 32 disposed between the upper end plug 28 and the top of the pellet stack. The fuel pellets 26 composed of fissile material are responsible for creating the reactive power of the reactor. A liquid moderator/coolant such as water, or water containing boron, is pumped upwardly through a plurality of flow openings in the lower core plate 14 to the fuel assembly. The bottom nozzle 12 of the fuel assembly 10 passes the coolant flow upwardly through the guide thimbles 18 and along the fuel rods 22 of the assembly in order to extract heat generated therein for the production of useful work.

To control the fission process, a number of control rods 34 are reciprocally movable in the guide thimbles 18 located at predetermined positions in the fuel assembly 10. Specifically, a rod cluster control mechanism 36 positioned above the top nozzle 16 supports the control rods 34. The control mechanism has an internally threaded cylindrical member 37 with a plurality of radially extending flukes or arms 38. Each arm 38 is interconnected to a control rod 34 such that the control mechanism 36 is operable to move the control rods vertically in the guide thimbles 18 to thereby control the fission process in the fuel assembly 10, all in a well-known manner.

Debris Trap Bottom Nozzle

As mentioned above, fuel assembly damage due to debris trapped at or below the lowermost one of the grids 20 has been found to be a problem. Therefore, to prevent occurrence of such damage, it is highly desirable to prevent this debris from passing through the bottom nozzle flow holes.

Figure 2:
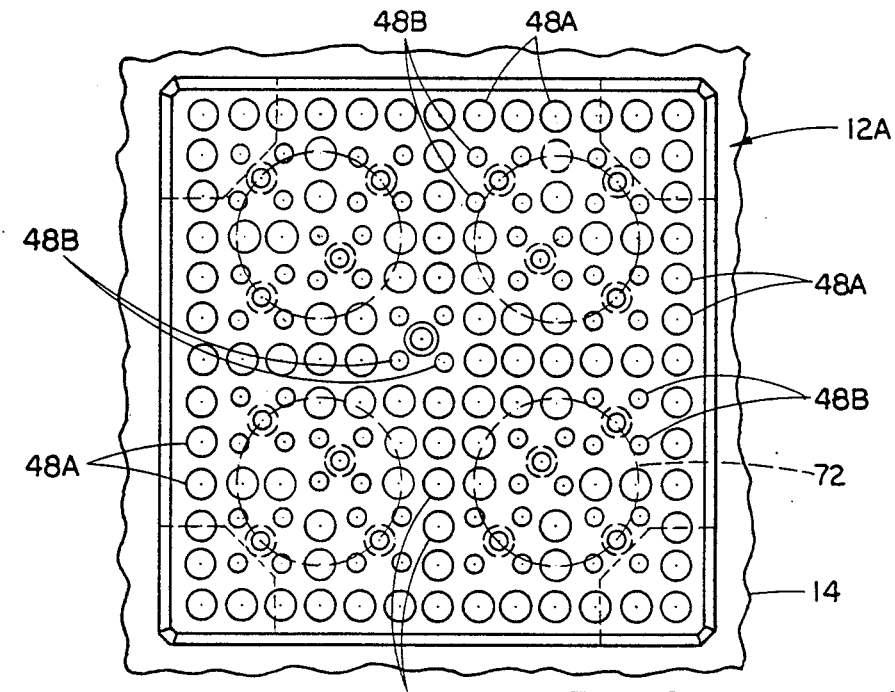
FIG. 2 is a top plan view of a prior art bottom nozzle showing the pattern of large diameter size flow holes in its plate.

The present invention relates to a bottom nozzle 12, which in addition to supporting the fuel assembly 10 on the lower core support plate 14, also contains features which function to filter out potentially damaging-size debris from the coolant flow passed upwardly through the bottom nozzle. The bottom nozzle 12 includes support means in the form of a plurality of corner legs 42 for supporting the fuel assembly 10 on the lower core plate 14 and a generally rectangular planar plate 46 suitably attached, such as by welding, to the corner legs 42. As seen in FIG. 2, the prior art bottom nozzle 12A has a plate 46A with a large number of relatively large flow holes 48A,48B of two different diameter sizes therein (for instance 0.25 and 0.50 inch). The flow holes 48A,48B are large enough in their respective diameters to pass the damaging-size debris typically carried in the coolant flow.

Figure 6:
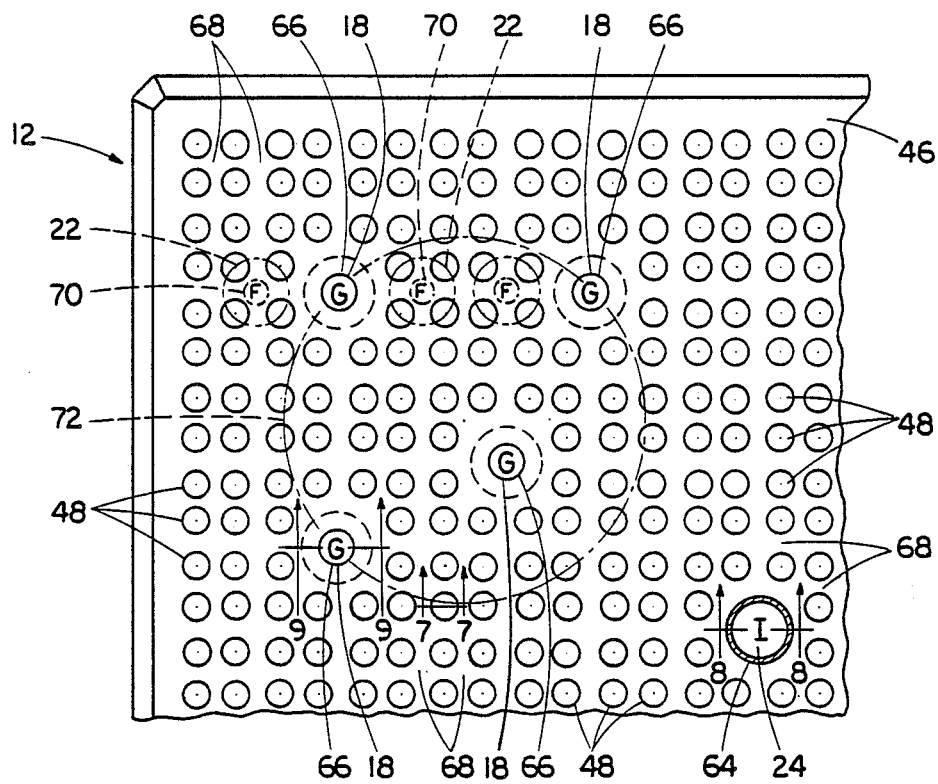
FIG. 6 is an enlarged top plan view of the upper left hand corner of the debris filter bottom nozzle of FIG. 3.
Figure 9:
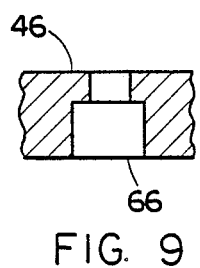
FIG. 9 is an enlarged cross-sectional view of one of the guide thimble holes in the debris filter bottom nozzle taken along line 9—9 of FIG. 6.

In the nozzle plate 46 of the debris filter bottom nozzle 12 of the present invention, the prior art large flow holes 48A,48B have been replaced with an increased number of smaller holes 48, being sized to "filter out" damaging-size debris without adversely affecting flow or pressure drop through the adapter plate 46 and across the fuel assembly 10. The debris filter bottom nozzle 12 is similar to the prior art bottom nozzle 12A, except for the number and size of the flow holes 48 in the plate 46 and the size of the inlet chamfers 50 at each flow hole 48, as shown in FIG. 6. The flow holes 48 are preferably uniform in cross-sectional size and defined in a pattern which substantially covers every portion of the plate 46 across its length and breadth.

Figure 4:
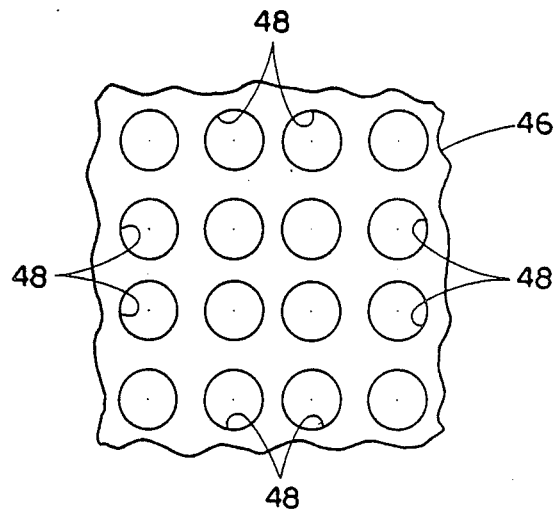
FIG. 4 is an enlarged top plan view of a fragmentary portion of the plate of the debris filter bottom nozzle of FIG. 3.
Figure 5:
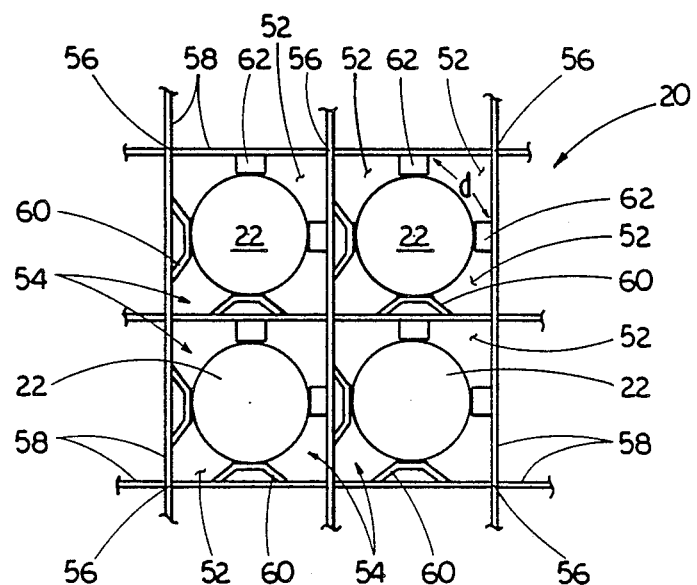
FIG. 5 is an enlarged bottom plan view of a fragmentary portion of the lowermost grid of the fuel assembly of the fuel assembly of FIG. 1.

The diameter of the flow holes 48, as shown in a fragmentary enlarged view of the plate 46 in FIG. 4, does not allow passage of debris that is of the size typically caught in the lowermost support grid 20. If the debris is small enough to pass through these plate flow holes 48, it will also pass through the grids 20 since the diameter of the flow holes 48 is smaller than the largest cross-sectional dimension "d" of the unoccupied spaces 52 through a cell 54 of the support grid 20, being shown in FIG. 5. Such spaces 52 are typically found in adjacent corners 56 form by the interleaved straps 58 composing the grid 20 and are bounded by the corners 56, respective dimples 60 and spring 62 formed on the straps 58, and the fuel rods 22 which extend through the grid cells 54. By ensuring that the debris is small enough to pass through the grid spaces 52, the debris filter bottom nozzle 12 of the present invention thereby significantly reduces the potential for debris-induced fuel rod failures.

Based upon a comprehensive analysis of fuel surveillance underwater television photographs of fuel assemblies from reactors experiencing debris-induced fuel rod failures, a nominal diameter for the flow holes 48 of about 0.190 inch was selected (with 0.190 +/−0.008 inch being preferred). It is possible for the holes 48 to be made somewhat smaller in diameter also. All observed primary debris-induced fuel rod failures were at or below the lowermost grid and appeared to be caused by debris somewhat larger than 0.190 inch in width. Other smaller debris typically present in the reactor coolant systems is believed to be relatively delicate in nature and not likely to cause rod damage since little or no significant damage has been observed above the lowermost grid. The evidence suggest that heretofore the damaging-size debris is effectively stopped by the lowermost grid 20. The debris filter bottom nozzle 12 with approximately 0.190 inch diameter size flow holes 48 defined in its plate 46 is expected to reduce by 90 percent the potential rod-damaging metallic debris carried into fuel assemblies by the primary coolant flow. Such estimate may be conservative since it appears likely that debris substantially larger than 0.190 inch in width may do a disproportionate amount of fuel rod damage.

Figure 7:
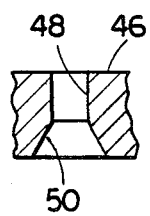
FIG. 7 is an enlarged cross-sectional view of one of the flow holes in the debris bottom nozzle taken along line 7—7 of FIG. 6.
Figure 8:
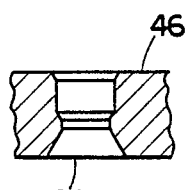
FIG. 8 is an enlarged cross-sectional view of the instrumentation tube hole in the debris filter bottom nozzle taken along line 8—8 of FIG. 6.

Referring now to FIGS. 6–10, it is seen that in addition to the large number of flow holes 48, the plate 46 includes one central instrumentation tube hole 64 and a number of guide thimble holes 66. As seen in FIG. 7, a long taper inlet chamfer 50, about 0.140 inch in length and forming an angle of about 12 to 15 degrees to the axis of the hole 48, is employed on each of the flow holes 48 to optimize the flow, i.e., minimize the loss coefficient increase due to the higher frictional effect inherent with the smaller flow holes 48. The longer chamfers 50 will prevent the flow stream from reattaching within the adapter plate holes 48 and increasing pressure drop across the fuel assembly 10. Any increase in pressure drop across the fuel assembly with the debris filter bottom nozzle 12 compared to an assembly with the conventional bottom nozzle 12A would be undesirable and very likely unacceptable.

Figure 10:
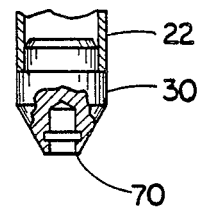
FIG. 10 is an enlarged fragmentary axial cross-sectional view of a lower end portion of one of the fuel rods in the fuel assembly of FIG. 1.

One addition conventional function of the bottom nozzle plate 46 is to capture the fuel rods 22, that is, to prevent them from dropping through the bottom nozzle 12. At initial startup, the fuel rods 22 are held by the grids 20 above the bottom nozzle 12, as seen in FIG. 1. However, after the reactor has operated for a time, the grids 20 commonly loosen their grip on the fuel rods 22 and some drop down on the top of the bottom nozzle plate 46. As seen in FIG. 6, the fuel rods 22 are aligned with the ligaments or sections 68 of the plate 46 between the flow holes 48. The flow holes 48 are packed in a density of about 16 per square inch. The sections 68 of the plate 46 extending between the flow holes 48 have a maximum dimension of 1/10 inch. If the fuel rods 22 having maximum diameters of about 0.400 inch were located over the flow holes 48, then when falling down on the plate 46 they would plug up the holes and cause an increase in pressure drop. The lower end plugs 30 of the fuel rods 22 which rest on sections 68 of the plate 46 have a terminal end diameter of about 0.150 inch and a tapered axial cross-sectional shape, as seen in FIG. 10, which does not block the holes 48. However, if the terminal end 70 of the lower end plug 30 was larger in diameter, then the section 68 of the plate 46 between the flow holes 48 would have to be larger in size in order to avoid the plug ends from covering portions of the adjacent holes 48. This would undoubtedly translate into fewer flow holes and an increase in pressure drop.

Flow testing of a fuel assembly incorporating the debris filter bottom nozzle 12 of the present invention unexpectedly identified a unique quality of it. Initially, the bottom nozzle 12 was designed to have a total flow area through a pattern of 0.190 inch flow holes in the plate equivalent to the total flow area through the pattern of the much larger holes 48A and 48B (approximately 0.25 and 0.50 inch diameters respectively) of the prior art bottom nozzle 12A of FIG. 2. It was believed that, at a minimum, matching the total flow areas and optimizing the inlet chamfers 50 in the smaller holes 48 would be necessary in order to keep the pressure drop close to that of the prior art bottom nozzle and to provide comparable flow. In the final design, the total flow area of the bottom nozzle of the present invention was slightly less than the total flow area of the prior art bottom nozzle. In the flow testing, however, although the flow area of the debris filter bottom nozzle 12 was less than that of the prior art bottom nozzle 12A, it was found that rather than obtaining the same or (as anticipated) a slightly higher pressure drop across the fuel assembly 10, the debris filter bottom nozzle 12 actually resulted in a 5% lower pressure drop than with the prior art bottom nozzle 12A.

Figure 3:
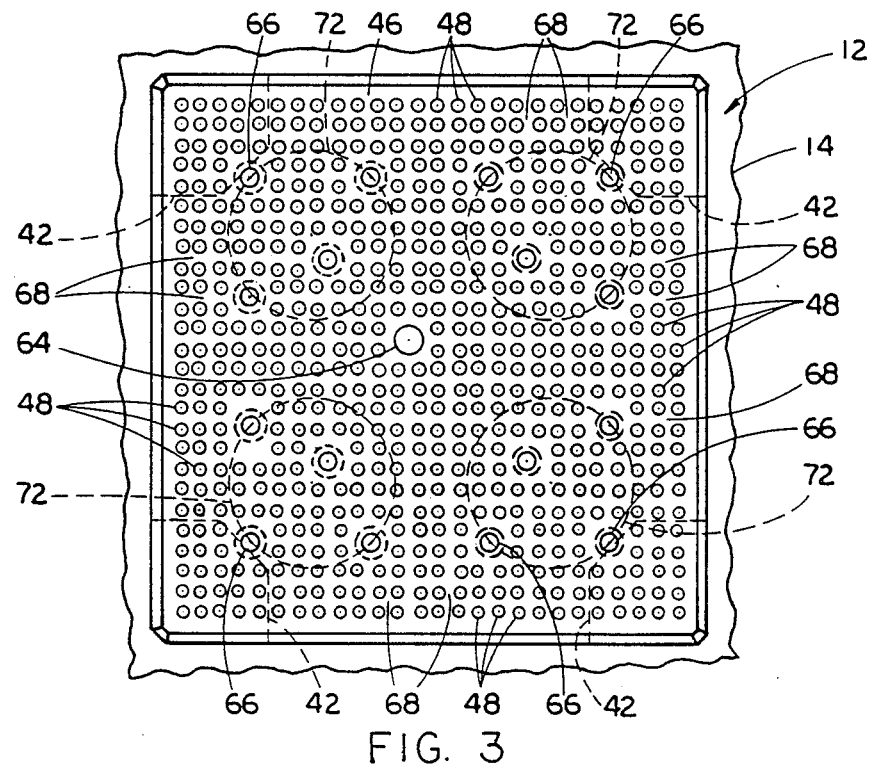
FIG. 3 is an enlarged top plan view of the debris filter bottom nozzle of the fuel assembly of FIG. 1, showing the pattern of small diameter size flow holes in its plate.

An investigation into the cause of this unexpected lower pressure drop revealed that it was due to a 19% greater flow area in the debris filter bottom nozzle 12A in four local areas, each directly above the four inlet flow holes, identified by number 72 in FIGS. 2, 3 and 6, of the lower core plate 14 aligned with each fuel assembly. This discovery seems to show that increasing the flow area through the portions of the plate 46 directly above the core plate flow holes 72 is more beneficial in reducing pressure drop than is providing an equivalent total flow area uniformly through the entire plate.

Several potential benefits from use of the low pressure drop bottom nozzle 12 in fuel assembly design are expected to be realized. The number of flow holes in the bottom nozzle can possibly be reduced by concentrating a high density hole pattern directly over the inlet core plate holes 72, thereby optiminzing the design for flow, reducing the manufacturing costs, and reducing the stress levels on the bottom nozzle. The lower pressure drop attained with this bottom nozzle design will also allow use of other features in fuel assemblies, such as intermediate flow mixer grids and baffle-jetting anti-vibration grids or clips, which typically are not used widely because they raise the pressure drop. Also, LOCA and DNB penalties caused by high pressure drop resulting in lower total pump heads can be reduced, as can loads on the reactor vessel head caused by high pressure drop across the fuel assemblies.

It is thought that the present invention and many of its attendant advantages will be understood from the foregoing description and it will be apparent that various changes may be made in the form, construction and arrangement thereof without departing from the spirit and scope of the invention or sacrificing all of its material advantages, the forms hereinbefore described being merely a preferred or exemplary embodiment thereof.

We claim:

1. In a fuel assembly for a nuclear reactor, said fuel assembly including a plurality of nuclear fuel rods, at least a lowermost grid supporting said fuel rods in an organized array and having unoccupied spaces defined therein adapted to allow flow of liquid coolant therethrough and past said fuel rods when said fuel assembly is installed in the nuclear reactor, said spaces each having a predetermined maximum cross-sectional dimension lying in a plane extending transverse to the direction of liquid coolant flow through the spaces, an instrumentation tube extending along said fuel rods and through said grid, and a plurality of guide thimbles extending along said fuel rods through and supporting said grid, a debris filter bottom nozzle disposed adjacent to and below said grid, below lower ends of said fuel rods, supporting said guide thimbles and said instrumentation tube and adapted to allow flow of liquid coolant into said fuel assembly, said debris filter bottom nozzle comprising:

(a) support means adapted to support said fuel assembly when installed in the nuclear reactor; and (b) a rigid plate fixed at its periphery on said support means and facing toward said lowermost grid, said plate having defined therethrough only three different types of holes, the first type being a plurality of non-flow holes receiving lower ends of said guide thimbles where they are attached to said plate, the second type being another non-flow hole receiving a lower end of said instrumentation tube where it is attached to said plate, and the third type being a plurality of circular flow holes all of which are packed in a density of about 16 per square inch and are individually 0.190+/−0.008 inch or less in diameter which is smaller than said predetermined maximum cross-sectional dimension of each of said unoccupied spaces through said lowermost grid, said plate also having sections extending between said flow holes of said third type which sections have a maximum dimension of one-tenth inch, said flow holes of said third type being the only holes of the three types allowing flow of liquid coolant through said plate and upwardly along said fuel rods and through said lowermost grid such that most debris being carried by the liquid coolant which is narrow enough in width to pass through said flow holes will also be capable of passing through said unoccupied grid spaces, whereas debris being carried by the liquid coolant which is wide enough to not pass through said unoccupied grid spaces and collect in said grid will not pass through said flow holes.

2. The bottom nozzle as recited in claim 1, wherein said holes each have a taper inlet chamfer of about 0.140 inch in length.

3. The bottom nozzle as recited in claim 2, wherein said inlet chamfer forms an angle of about 12 to 15 degrees to the central axis of said hole.

4. In a nuclear reactor core including liquid coolant flowing upwardly through said core, a lower core support plate having inlet flow openings through which flows said liquid coolant, and a plurality of fuel assemblies resting on said lower core support plate, each said fuel assembly including a plurality of nuclear fuel rods, at least a lowermost grid supporting said fuel rods in an organized array and having unoccupied spaces defined therein adapted to allow flow of said liquid coolant therethrough and past said fuel rods, said spaces each having a predetermined maximum cross-sectional dimension lying in a plane extending transverse to the direction of liquid coolant flow through the spaces, an instrumentation tube extending along said fuel rods and through said grid, and a plurality of guide thimbles extending along said fuel rods through and supporting said grid, a debris filter bottom nozzle in each said fuel assembly being disposed above the inlet flow openings of the lower core support plate adjacent to and below said grid, below lower ends of said fuel rods, supporting said guide thimbles and said instrumentation tube and adapted to allow flow of liquid coolant into said fuel assembly, said debris filter bottom nozzle comprising:

(a) support means resting on said lower core plate of said nuclear reactor core; and (b) a rigid plate fixed at its periphery on said support means and facing toward said lowermost grid, said plate having defined therethrough only three different types of holes, the first type being a plurality of non-flow holes receiving lower ends of said guide thimbles where they are attached to said plate, the second type being another non-flow hole receiving a lower end of said instrumentation tube where it is attached to said plate, and the third type being a plurality of circular flow holes all of which are packed in a density of about 16 per square inch and are individually 0.190 +/−0.008 inch or less in diameter which is smaller than said predetermined maximum cross-sectional dimension of each of said unoccupied spaces through said lowermost grid, said plate also having sections extending between said flow holes of said third type which sections have a maximum dimension of one-tenth inch, said flow holes of said third type being the only holes of the three types allowing flow of liquid coolant through said plate and upwardly along said fuel rods and through said lowermost grid such that most debris being carried by the liquid coolant which is narrow enough in width to pass through said flow holes will also be capable of passing through said unoccupied grid spaces, whereas debris being carried by the liquid coolant which is wide enough to not pass through said unoccupied grid spaces and collect in said grid will not pass through said flow holes.

5. The bottom nozzle as recited in claim 4, wherein said holes each have a taper inlet chamfer of about 0.140 inch in length.

6. The bottom nozzle as recited in claim 5, wherein said inlet chamfer forms an angle of about 12 to 15 degrees to a central axis of said hole.

* * * * *